United States Patent
Abramov

(10) Patent No.: US 11,520,861 B2
(45) Date of Patent: *Dec. 6, 2022

(54) MULTI-DEVICE DIGITAL RIGHTS MANAGEMENT SYSTEM

(71) Applicant: SLING MEDIA L.L.C., Foster City, CA (US)

(72) Inventor: Andrey Abramov, Foster City, CA (US)

(73) Assignee: Sling Media LLC, Foster City, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/233,978

(22) Filed: Apr. 19, 2021

(65) Prior Publication Data

US 2021/0240798 A1 Aug. 5, 2021

Related U.S. Application Data

(63) Continuation of application No. 15/926,814, filed on Mar. 20, 2018, now Pat. No. 11,010,453.

(60) Provisional application No. 62/612,025, filed on Dec. 29, 2017.

(51) Int. Cl.
*H04L 29/06* (2006.01)
*G06F 21/10* (2013.01)

(52) U.S. Cl.
CPC ...... *G06F 21/10* (2013.01); *G06F 2221/0704* (2013.01)

(58) Field of Classification Search
CPC .................. G06F 21/10; G06F 2221/0704
See application file for complete search history.

(56) References Cited

U.S. PATENT DOCUMENTS

| 2011/0058675 | A1* | 3/2011 | Brueck | H04L 65/80 709/229 |
| 2015/0256867 | A1* | 9/2015 | Chow | H04N 21/47202 725/31 |
| 2017/0124297 | A1* | 5/2017 | Baldwin | G06F 21/60 |

* cited by examiner

*Primary Examiner* — Wasika Nipa
(74) *Attorney, Agent, or Firm* — KW Law, LLP

(57) ABSTRACT

A multi-device digital rights management server is provided. The server may include, but is not limited to, a processor communicatively coupled to a communications system and a memory, the processor configured to receive, from the communications system, a request to transfer digital content from a first user device to a second user device, update, upon receipt of the request, digital rights management data stored in the memory to enable both the first user device and the second user device to consume the digital content, receive, from the communications system, notice that one of the first user device and the second user device is consuming the digital content, update, upon receipt of the notice, the digital rights management data to disable the other of the first user device and the second user device from consuming the digital content.

19 Claims, 3 Drawing Sheets

100

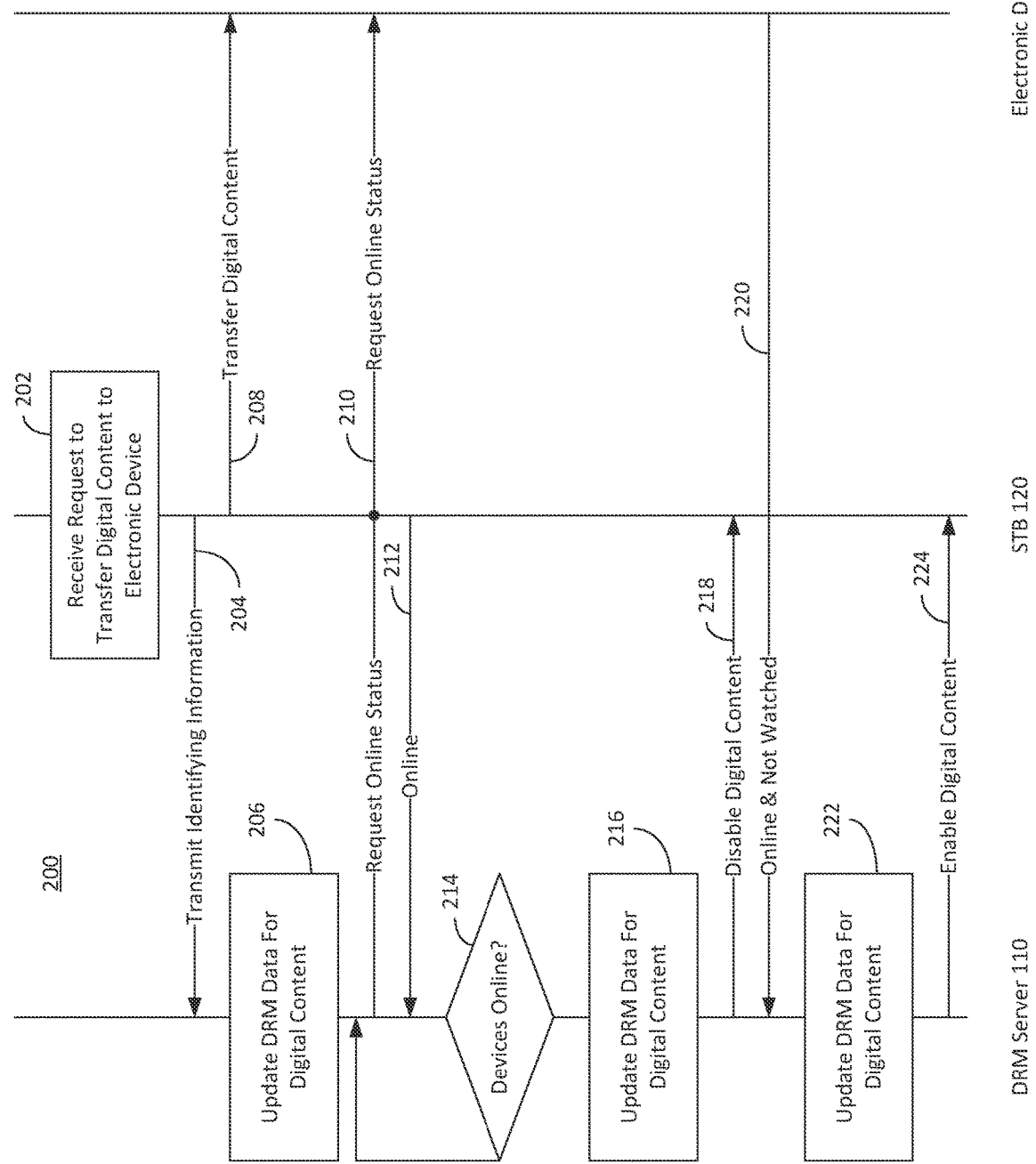

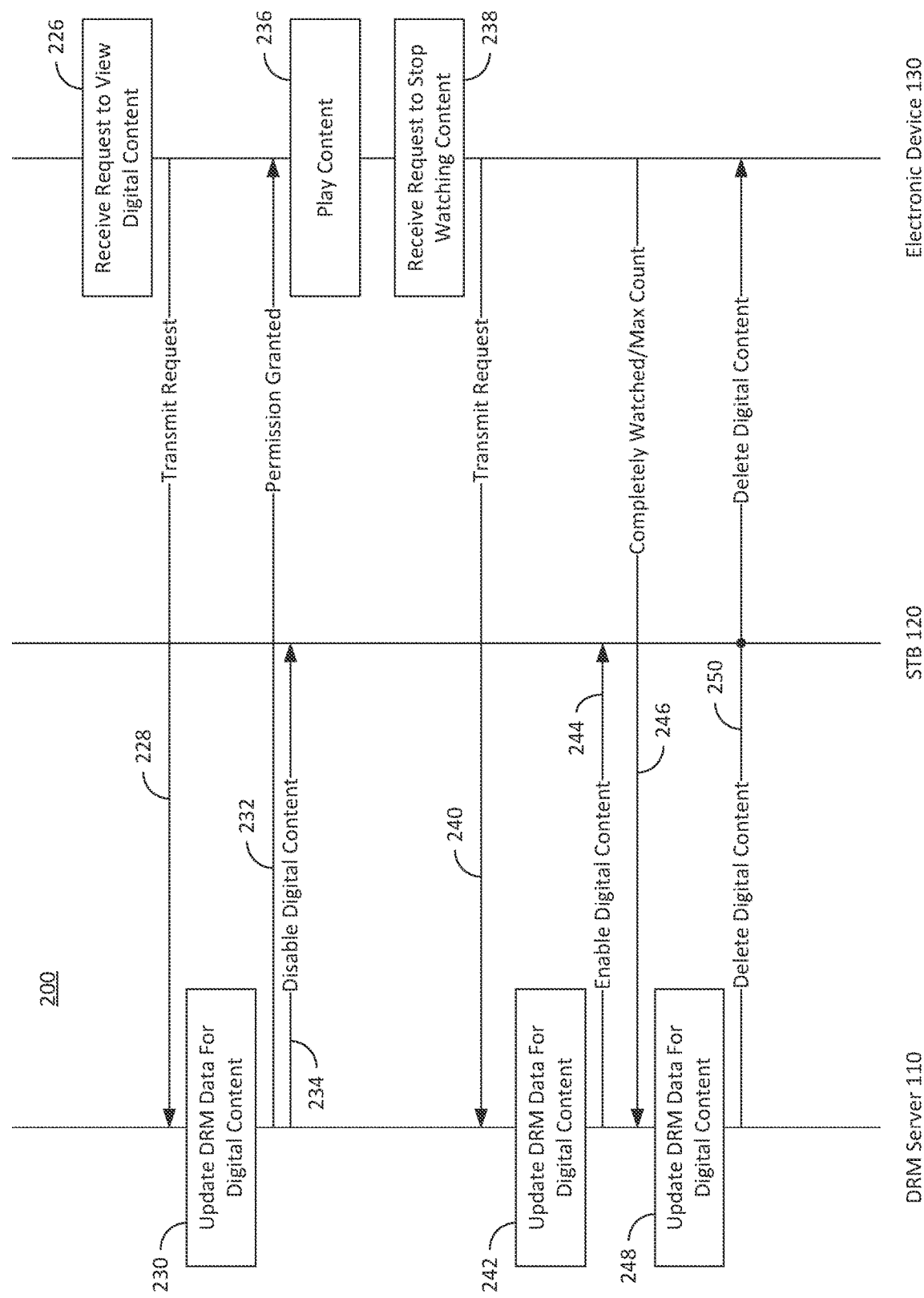

MULTI-DEVICE DIGITAL RIGHTS MANAGEMENT SYSTEM

PRIORITY

Figure 1:
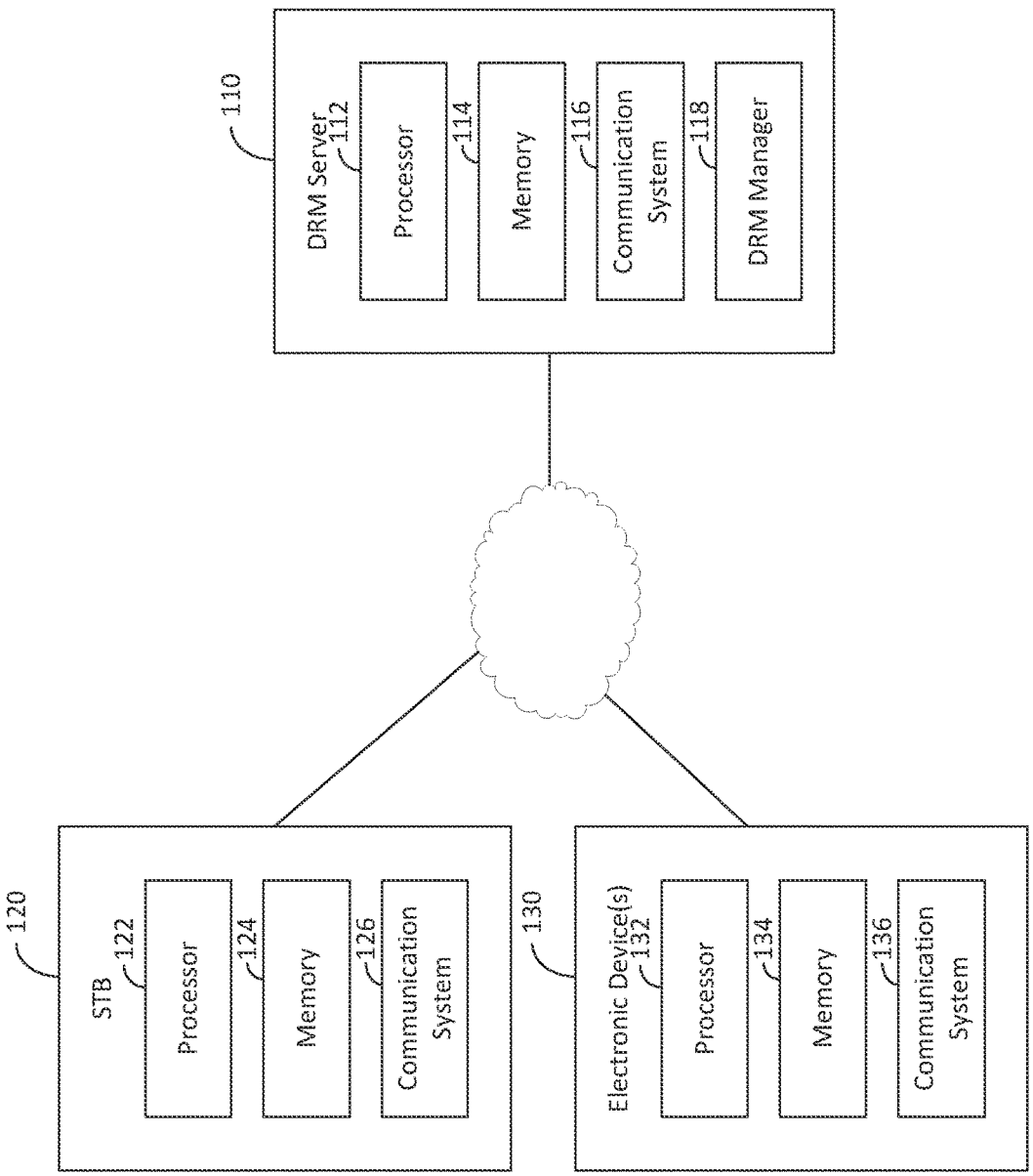

This application is a continuation of the Parent patent application Ser. No. 15/926,814, which was filed on Mar. 20, 2018 and the Provisional U.S. Patent Application Ser. No. 62/612,025, which was filed on Dec. 29, 2017, both are incorporated herein by reference.

TECHNICAL FIELD

The following relates to electronic devices, and more particularly to managing digital content on electronic devices.

BACKGROUND

Digital content, such as music, movies, television shows web-based videos and the like are increasingly popular. Users tend to have multiple devices upon which the content can be consumed (i.e., watched, listened to, etc.) such as televisions, desktop computers, laptop computers, cellular phones, tablet computers, and the like. Certain digital content may have access controls which limit the consumption of the digital content. These access controls, from the user's perspective, undesirably limit the user's ability to consume the digital content or make the digital content difficult to view or listen to the digital content.

SUMMARY

In accordance with one embodiment, a multi-device digital rights management server is provided. The multi-device digital rights management server may include, but is not limited to, a communications system, a memory configured to store digital rights management data for digital content, and a processor communicatively coupled to the communications system and the memory, the processor configured to receive, from the communications system, a request to transfer the digital content from a first user device to a second user device, update, upon receipt of the request to transfer the digital content, the digital rights management data to enable both the first user device and the second user device to consume the digital content, receive, from the communications system, notice that one of the first user device and the second user device is consuming the digital content, and update, upon receipt of the notice that one of the first user device and the second user device is consuming the digital content, the digital rights management data to disable the other of the first user device and the second user device from consuming the digital content.

DESCRIPTION OF THE DRAWING FIGURES

Exemplary embodiments will hereinafter be described in conjunction with the following drawing figures, wherein like numerals denote like elements.

FIG. 1 is a block diagram of a multi-device digital rights management system in accordance with an embodiment; and FIGS. 2A and 2B illustrate a method of operating the multi-device digital rights management system, in accordance with an embodiment.

DETAILED DESCRIPTION

Certain digital content may include digital rights management which limits a user to having only one copy of the digital content and may limit the number of times a user may view the content. However, a user may have multiple devices and wish to access the digital content via an unknown device. In other words, the user may have multiple devices and may not know which user device they will actually first watch the digital content upon. Accordingly, rather than forcing the user to transfer the digital content back and forth between multiple devices, a multi-device digital rights management system is provided which manages digital content across multiple user devices.

FIG. 1 is a block diagram of a multi-device digital rights management (MDDRM) system 100 in accordance with an embodiment. The MDDRM system 100 includes a digital right management (DRM) server 110. The DRM server 110 manages the rights and use of digital content on multiple devices, as discussed in further detail below. The digital content may be, for example, a movie, a television show, music, or any other audio or video data. In one embodiment, for example, the DRM server 110 may be a source of the digital content. In other words, the DRM server 110 may distribute the digital content in addition to managing the content. However, in another embodiment, another source or multiple other sources may distribute the digital content while the DRM server 110 manages the content.

The DRM server includes a processor 112 and a memory 114. The processor 112 may be a central processing unit (CPU), a graphics processing unit (GPU), an application specific integrated circuit (ASIC), a microcontroller, a field programmable gate array (FPGA), or any other logic circuit or combination thereof. The memory 114 may be any combination of volatile and non-volatile memory. In one embodiment, for example, a portion of the memory 114 may be a cloud based memory. In other words, the DRM server 110 may access one or more remote memory devices when distributing digital content or managing the digital content as discussed in further detail below.

The DRM server 110 further includes a communication system 116. The communication system 116 may utilize any wired or wireless communication protocols, including, but not limited to, cellular, WIFI, hypertext transfer protocol (HTTP), secure hypertext transfer protocol (HTTPS), file transfer protocol (FTP), or the like, and any combination thereof.

The DRM server 110 further includes a DRM manager 118. In one embodiment, for example, the DRM manager 118 may be implemented via the processor 112 and memory 114. However, in another embodiment, the DRM manager 118 may be implemented via hardware (e.g., another processor) and memory that are dedicated to the DRM manager 118.

The DRM manager 118 manages the rights and use of digital content. In particular, the DRM manager 118 manages digital content for an account associated with a user who utilizes multiple devices. The data for the account may be stored in the memory 114 including identifying information associated with each user device. In the embodiment illustrated in in FIG. 1, the multiple user devices include a set-top box (STB) 120 and at least one other electronic device 130. However, the DRM manager 118 can manage the digital content on any combination of devices (i.e., only multiple STBs, only multiple electronic devices, or any combination of any number of both).

The STB 120 includes a processor 122, a memory 124 and a communication system 126. The processor 122 may be a central processing unit (CPU), a graphics processing unit (GPU), an application specific integrated circuit (ASIC), a microcontroller, a field programmable gate array (FPGA), or any other logic circuit or combination thereof. The memory 124 may be any combination of volatile and non-volatile memory. In one embodiment, for example, a portion of the memory 124 may be a cloud based memory. In other words, the STB 120 may access one or more remote memory devices. For example, the STB 120 may be, for example, a digital video recorder (DVR) which can save digital content for later viewing on a television on either a local memory 124 or a remote memory 124 accessible via the communication system 126. The communication system 126 may utilize any wired or wireless protocol, including, but not limited to, satellite, cellular, WIFI, Bluetooth, ZigBee, Ethernet, or the like or any combination thereof.

The electronic device(s) 130 may be, for example, a portable DVR, a cellular phone, a tablet computer, a laptop computer, or the like. As discussed above, any number of electronics devices may be used by a user in the MDDRM system 100. Each electronic device may include a processor 132, a memory 134 and a communication system 136. The processor 132 may be a central processing unit (CPU), a graphics processing unit (GPU), an application specific integrated circuit (ASIC), a microcontroller, a field programmable gate array (FPGA), or any other logic circuit or combination thereof. The memory 134 may be any combination of volatile and non-volatile memory. In one embodiment, for example, a portion of the memory 134 may be a cloud based memory. In other words, the electronic device 130 may access one or more remote memory devices via the communication system 136. The communication system 136 may utilize any wired or wireless protocol, including, but not limited to, satellite, cellular, WIFI, Bluetooth, ZigBee, Ethernet, or the like or any combination thereof.

In one embodiment, for example, the functions of the DRM server 110 may be executed by one of the user devices. For example, the STB 120 may be configured to act as the DRM server 110 in addition to a device which can play the digital content. In this embodiment, the STB 120 would control and monitor access to the digital content between itself as well as any electronic devices 130 which are associated with the user of the STB 120.

FIGS. 2A and 2B illustrate a method 200 of operating the MDDRM system 100, in accordance with an embodiment. FIGS. 2A and 2B illustrate a specific use case of the method 200. In the embodiment illustrated in FIG. 2A, the digital content is already saved in the STB 120. However, the electronic device 130 could also be the user device which first stores the digital content. Furthermore, while FIG. 2 illustrates that certain actions (e.g., watching content, receiving requests to transfer content, etc.) will be described as being conducted on the STB 120 or that certain actions will be described as being conducted on the electronic device 130, either the electronic device 130 or the STB 120 can perform any of the respective actions or commands.

The method 200 begins when the STB 120 receives a user request to transfer the digital content to the electronic device 130. (Step 202). Upon receipt of the request, the STB 120 transmits the identifying information of the requested electronic device 130 to the DRM server 110. (Step 204). The identifying information may include, for example, a hardware serial number associated with the electronic device 130 or other uniquely identifying information. The DRM server 110, upon receipt of the identifying information updates the DRM data associated with the digital content. (Step 206). In other words, the DRM server 110 updates the DRM data associated with the digital content to reflect that the digital content is being uploaded to the requested electronic device 130. As discussed above, the MDDRM system 100 allows the content to remain viewable on both the STB 120 and the electronic device 130 until the content is played on either one of the user devices. Accordingly, the update of the DRM data does not remove the permission for the STB 120 to view the digital content. One benefit of the embodiment is that the electronic device 130 would not have to transfer the digital content back to the STB 120 for the user to watch the digital content on the STB 120. Transferring digital content, in particular movies or other large files, can take a significant amount of time depending upon the bandwidth available to the respective devices. Accordingly, by allowing the digital content to remain on the STB 120, while preserving the DRM rules that require that the digital content only be viewable on one device at a time or only watched a predetermined number of times, the MDDRM system 100 improves the user experience.

After receipt of the request to transfer the digital content, the STB 120 uploads or otherwise transfers the digital content to the electronic device 130. (Step 208). While the exemplary use case illustrated in FIG. 2A illustrates the STB 120 transferring the digital content, the digital content may be transferred to the electronic device 130 from other sources such as the DRM server 110 or the original source of the digital content.

In one embodiment, for example, the DRM server 110 may periodically request for an online status update for each user device in the DRM data that is registered to have access to the digital content. (Step 210). When any device is offline, the DRM 110 server cannot get status updates from the respective device, and, thus, assumes that the content has been watched on the offline device. In the use case illustrated in FIG. 2, the STB 120 remains online and responds to the status request by confirming to the DRM server 110 that the STB 120 is online. (Step 212). In this use case, the electronic device 130 has gone offline and, thus, does not respond to the status check. The electronic device 130 or the STB may go offline if, for example, the electronic device is a cellular phone in airplane mode, the electronic device 130 or STB 120 loses an internet connection or cellular connection or the like. The DRM server 110 may perform the status check at any fixed or random interval.

After a predetermined period of time allowed for a response, the DRM server 110 determines if any of the user devices are offline. (Step 214). A user device is determined to be offline when the user device does not respond to the status check. The DRM server 110 then updates the DRM data for all of the online devices, in this case the STB 120 to disable the STB 120 from playing the digital content. (Step 216). A disabled user device is unable to play the digital content. In one embodiment, for example, the digital content may be removed from a playable list when the respective user device is disabled. In another embodiment, for example, a teaser or trailer for the digital content may be viewable when a user device is disabled, but not the entire digital content.

In one embodiment, for example, the user device which the user wishes to use to play the digital content must request permission from the DRM server 110 prior to playing the digital content. Accordingly, in this embodiment, disabling the respective user device from playing the digital content within the DRM data on the DRM server 110 effectively disables the digital content from being played on the respective device. However, in another embodiment, the DRM server 110 may need to actively disable the respective user device from playing the digital content. In this embodiment, the DRM server 110 may send a command to the respective user device, in this use case the STB 120, to disable the respective user device from playing the content. (Step 218). Disabling the digital content from playing on the user device, however, preferably does not delete the digital content from the respective user device. Rather, as discussed above, the digital content is merely disabled on the respective device. The digital content may have limited number of user views and/or may be limited to viewing on one device. Accordingly, by merely disabling the content, rather than deleting the content, the user does not have to transfer the digital content back to the disabled device if the user has not watched the content on the electronic device 130 and later decides to watch the content on the STB 120, thereby saving the potentially significant amount of time that would be required to transfer or re-download the digital content.

When the offline device, in this case the electronic device 130 comes back online, the electronic device can either automatically connect to the DRM server 110 to updates its online status upon coming back online or respond to the next status request (Step 210) with an online status update. (Step 220). When digital content on the electronic device 130 has DRM data which limits the number of views, the electronic device 130 may additionally send data to the DRM server 110 indicating if the digital content was watched, either partially or wholly. If the content is only partially watched, the user may be authorized to continue watching the content on any of the user devices. Accordingly, if, for example, a user began to watch a movie on a plane on a user device in online mode, the user may continue to watch the movie from the point in which they left off on any one of the user devices. Upon receipt of the online status update from the electronic device, the DRM server 110 updates the DRM data for the respective digital content (Step 222) and if the content is still viewable on other devices (i.e., the watch count has not been exceeded), the DRM server 110 sends an update to the STB 120 to re-enable the digital content. (Step 224). If the digital content was partially watched on the offline device, the DRM server 110 will also send a timestamp for where the digital content should be resumed from.

Continuing to FIG. 2B, when a user wishes to watch digital content on a user device, the respective user device, in this use case the electronic device 130, receives the request via a user interface of the respective user device. (Step 226). The viewing request is then transmitted by the respective user device to the DRM server 110. (Step 228). In response to receiving the viewing request, the DRM server 110 updates the DRM data to reflect the viewing request. (Step 230). In the embodiment in which the DRM server 110 must authorize the viewing, the DRM server 110 would send permission to the electronic device 130 to view the digital content (Step 232) and transmit a command to any other user devices, in this case the STB 120, to disable the digital content. (Step 234). This preserves the DRM for the digital content, only allowing the user to view the digital content on one device. Upon receipt of the permission, when necessary, the electronic device 130 can begin playing the digital content. (Step 236).

In one particular use case, the user does not completely watch the digital content. Accordingly, the electronic device 130 receives a request to stop watching the digital content. (Step 238). In response to the received request, the electronic device 130 transmits the stop request to the DRM server 110 including the timestamp within the digital content where the user stopped watching the digital content. (Step 240). The DRM server 110 updates the DRM data to reflect the stop request, including the time stamp data (Step 242), and then transmits a command to re-enable the STB 120 to play the digital content. (Step 244). This allows the user to continue viewing the digital content on any of the user devices.

In another use case, when a user has watched the entire digital content, the electronic device 130 would transmit notice to the DRM server 110 that the content has been watched. (Step 246). The DRM server 110 would update the DRM data for the digital content based upon the notice. (Step 248). As discussed above, some digital content may have viewing limits. Movie rentals, for example, may only be able to be viewed once. Other digital content may be viewed more than once but have a maximum number of viewings. Other digital content may expire after a certain time period. If the watch limit has been exceeded, or the digital content expires for any other reason, the DRM server 110 sends a command to all of the user devices, here STB 120 and electronic device 130, to delete the content. (Step 250). However, if the digital content is still available, the DRM server 110 continues to periodically transmit online status requests (Step 210) and continues to monitor for viewings of the digital content.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A multi-device digital rights management (DRM) system, comprising:
    a first user device sending a request to play digital content to a multi-device DRM server;
    in response to receipt of the request to play, the first user device is authorized by the multi-device DRM server to update DRM data located at the multi-device DRM server to reflect the request to play from the first user device;
    the first user device receives an enable command from the multi-device DRM server to allow permission for playing of the digital content available at the first user device, while a disable command is sent to a second user device to prevent playing of the digital content available for playing at the second user device;
    in response to the disable command sent to the second user device, the digital content is still preserved on the second user device the digital content for playing when requested and permissioned for playing by the multi-device DRM server while not played concurrently on the first user device,
        wherein the DRM data is configured by the multi-device DRM server to reflect a stoppage request,
        wherein the DRM data comprises a stoppage time,
        wherein the second user device receives a command to re-enable the second user device to play the digital content; and
    in response to a number of times viewed exceeding a watch limit for playing the digital content, the first user device receives a delete command from the multi-device DRM server to delete the digital content that is available at least at the first user device.

2. The multi-device DRM system of claim 1, further comprising:
in response to a request of a stoppage to play the digital content on the first user device, the first user device sends a notification of the stoppage to play the digital content to not allow the permission to further play the digital content available at the first user device.

3. The multi-device DRM system of claim 2, further comprising:
in response to the receipt of the stoppage to play request, the first user device transmits the request to the multi-device DRM server to update the DRM data about the stoppage to play request.

4. The multi-device DRM system of claim 3, further comprising:
in response to transmission of a notice of a stoppage of playing request to the multi-device DRM server, a time stamp is configured within the digital content that provides the notice of a stoppage time to the stoppage of playing request by the first user device to play the digital content.

5. The multi-device DRM system of claim 4, wherein the re-enable command allows and permissions the second user device to continue to play the digital content.

6. The multi-device DRM system of claim 5, further comprising:
in response to a determination that the digital content has been completely played at the first user device, the first user device transmits notice of completion to the multi-device DRM server; and
in response to the receipt of the notice of completion, the DRM data is updated by the multi-device DRM server to reflect the notice of completion.

7. The multi-device DRM system of claim 6, further comprising:
the digital content is configured with a watch limit comprising a limited number of times the digital content is allowed played, or a limited time period the digital content is allowed played.

8. The multi-device DRM system of claim 7, further comprising:
in response to an expiration of the limited time period of the watch limit for the playing of the digital content, at least the first user device receives the command from the multi-device DRM server to delete the digital content that is available at least at the first user device.

9. The multi-device DRM system of claim 8, further comprising:
in response to the digital content still available at the first user device, the first user device sends periodic transmissions of online status to the multi-device DRM server for monitoring by the multi-device DRM server of playing of the digital content.

10. A method for multi-device digital rights management (DRM), comprising:
sending, by a first user device, a request to play digital content to a multi-device DRM server;
in response to receipt of a sent request to play, authorizing the first user device, by the multi-device DRM server and by updating DRM data located at the DRM server, to reflect the request for playing of the digital content by the first user device;
receiving, by the first user device, an enable command from the multi-device DRM server for allowing permission for playing of the digital content available at the first user device;
sending, by the multi-device DRM server, a disable command to a second user device to prevent playing of the digital content that is available locally on the second user device; and
in response to the disable command sent to the second user device, restricting playback on the second user device and preserving the digital content on the second user device for playing when permissioned by the multi-device DRM server,
wherein the DRM data is configured by the multi-device DRM server to reflect a stoppage request in response to the first use device terminating playback,
wherein the DRM data comprises a stoppage time,
wherein the second user device receives a command to re-enable the second user device to play the digital content; and
in response to a number of times viewed exceeding a watch limit for playing the digital content, the first user device receives a delete command from the multi-device DRM server to delete the digital content from the first user device.

11. The method according to claim 10, further comprising:
in response to a request of stoppage of playing of the digital content on the first user device, sending by the first user device a notification of a stoppage request of playing of the digital content to the multi-device DRM server for not allowing the permission of further playing of the digital content that is available at the first user device.

12. The method according to claim 11, further comprising:
in response to the receipt of the stoppage of playing request, transmitting by the first user device the request to the DRM server for updating the DRM data about the stoppage request for playing the digital content.

13. The method according to claim 12, further comprising:
in response to transmitting of the stoppage of playing request to the DRM server, configuring a time stamp within the digital content providing notice of stoppage time of playing by first user device of the digital content.

14. The method according to claim 13, further comprising:
configuring the DRM data by the multi-device DRM server for reflecting the stoppage request wherein the DRM data comprises the stoppage time; and
receiving by the second user device a command by the multi-device DRM server for re-enabling the second user device for playing of the digital content.

15. The method according to claim 14, further comprising:
providing a re-enable command for allowing the second user device to continue playing the digital content.

16. The method according to claim 15, further comprising:
in response to a determining that the digital content has been completely played at the first user device, transmitting by the first user device a notice of completion to the multi-device DRM server; and in response to the receipt of the notice of completion, updating the DRM data by the DRM server for reflecting the notice of completion.

17. The method according to claim 16, further comprising:
configuring the digital content with a watch limit comprising a limited number of times for allowing playing the digital content, or a limited time period for allowing playing the digital content.

18. The method according to claim 17, further comprising:
configuring the digital content with a watch limit comprising a limited number of times for allowing playing the digital content, or a limited time period for allowing playing the digital content; and
in response to exceeding a limited allowed times for playing the digital content or expiring of a limited time period available of the watch limit for the playing the digital content, receiving by at least the first user device a command from the multi-device DRM server for deleting the digital content available at least at the first user device.

19. A method comprising:
receiving a request to play digital content at a digital rights management (DRM) server from a first user device;
authorizing, by the DRM server, the first user device to update DRM data to reflect the request to play from the first user device;
transmitting an enable command to the first user device to permit playback of the digital content at the first user device;
transmitting a disable command to a second user device to prevent playback of the digital content at the second user device, wherein the second user device retains the digital content for later playback in response to the disable command;
updating DRM data at the DRM server to reflect a stoppage request in response to the first user device terminating playback of the digital content, wherein the DRM data comprises a stoppage time;
transmitting a second enable command to the second user device authorizing the second user device to play the digital content; and
transmitting a delete command from the DRM server to the first user device to trigger deletion of the digital content stored on the first user device in response to a view count of the digital content exceeding a watch limit for the digital content.

* * * * *